(12) United States Patent
Korkishko et al.

(10) Patent No.: US 8,078,871 B2
(45) Date of Patent: Dec. 13, 2011

(54) APPARATUS AND SYSTEM FOR REMOTELY VERIFYING INTEGRITY OF MEMORY FOR MOBILE PLATFORM, AND METHOD THEREFOR

(75) Inventors: Tymur Korkishko, Suwon-si (KR); Kyung-hee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1319 days.

(21) Appl. No.: 11/359,384

(22) Filed: Feb. 23, 2006

(65) Prior Publication Data

US 2006/0190996 A1    Aug. 24, 2006

(30) Foreign Application Priority Data

Feb. 23, 2005    (KR) .................. 10-2005-0014881

(51) Int. Cl.
*H04L 9/32* (2006.01)
*G06F 13/00* (2006.01)
(52) U.S. Cl. ...................... 713/168; 711/111
(58) Field of Classification Search .............. 713/168; 711/111
See application file for complete search history.

(56) References Cited

U.S. PATENT DOCUMENTS

| | | | |
|---|---|---|---|
| 6,789,192 B2* | 9/2004 | Hirota et al. | 713/172 |
| 7,062,602 B1* | 6/2006 | Moore et al. | 711/112 |
| 2002/0138544 A1* | 9/2002 | Long | 709/107 |
| 2002/0169960 A1* | 11/2002 | Iguchi et al. | 713/174 |
| 2002/0176575 A1* | 11/2002 | Qawami et al. | 380/201 |
| 2003/0149854 A1* | 8/2003 | Yoshino et al. | 711/173 |
| 2003/0174839 A1* | 9/2003 | Yamagata et al. | 380/270 |
| 2003/0182571 A1* | 9/2003 | Hashimoto et al. | 713/194 |
| 2004/0006695 A1* | 1/2004 | Ishibashi et al. | 713/175 |
| 2004/0059916 A1* | 3/2004 | Mizushima et al. | 713/172 |
| 2004/0187000 A1* | 9/2004 | Silverbrook | 713/171 |
| 2004/0255119 A1* | 12/2004 | Ukeda et al. | 713/169 |
| 2006/0015749 A1* | 1/2006 | Mittal | 713/190 |
| 2008/0155275 A1* | 6/2008 | Natarajan et al. | 713/193 |

FOREIGN PATENT DOCUMENTS

| | | |
|---|---|---|
| WO | 0203175 A2 | 1/2002 |
| WO | 0217048 A2 | 2/2002 |
| WO | 02065258 A2 | 8/2002 |

OTHER PUBLICATIONS

Seshadri A., et al., "SWATT: SoftWare-based ATTestation for Embedded Devices," IEEE Symposium on Security and Privacy, May 9-12, 2004, ISBN: 0-7695-2136-3.
Menezes, A.J., et al., "Handbook of Applied Cryptography, Chapter 10: Identification and Entity Authentication," Handbook of Applied Cryptography, 1997, pp. 403, ISBN: 0-8493-8523-7.

* cited by examiner

*Primary Examiner* — Techane Gergiso
(74) *Attorney, Agent, or Firm* — Sughrue Mion, PLLC

(57) ABSTRACT

A verification apparatus for a mobile platform for remotely verifying the integrity of a device that is connected to a network and has a shared private key includes a verifying unit that determines whether the device shares a private key with the verification apparatus by checking whether the authentication code generated by the verification apparatus matches the authentication code generated by the device; a calculating unit that generates a local check code that verifies the integrity of the memory; an interface unit that transmits, to the device, the information that the verification apparatus uses to generate an authentication code and the integrity check parameter used to generate a remote check code, and receives the authentication code and the remote check code from the device; and a determining unit that verifies the integrity of the memory if the local check code matches the remote check code.

29 Claims, 5 Drawing Sheets

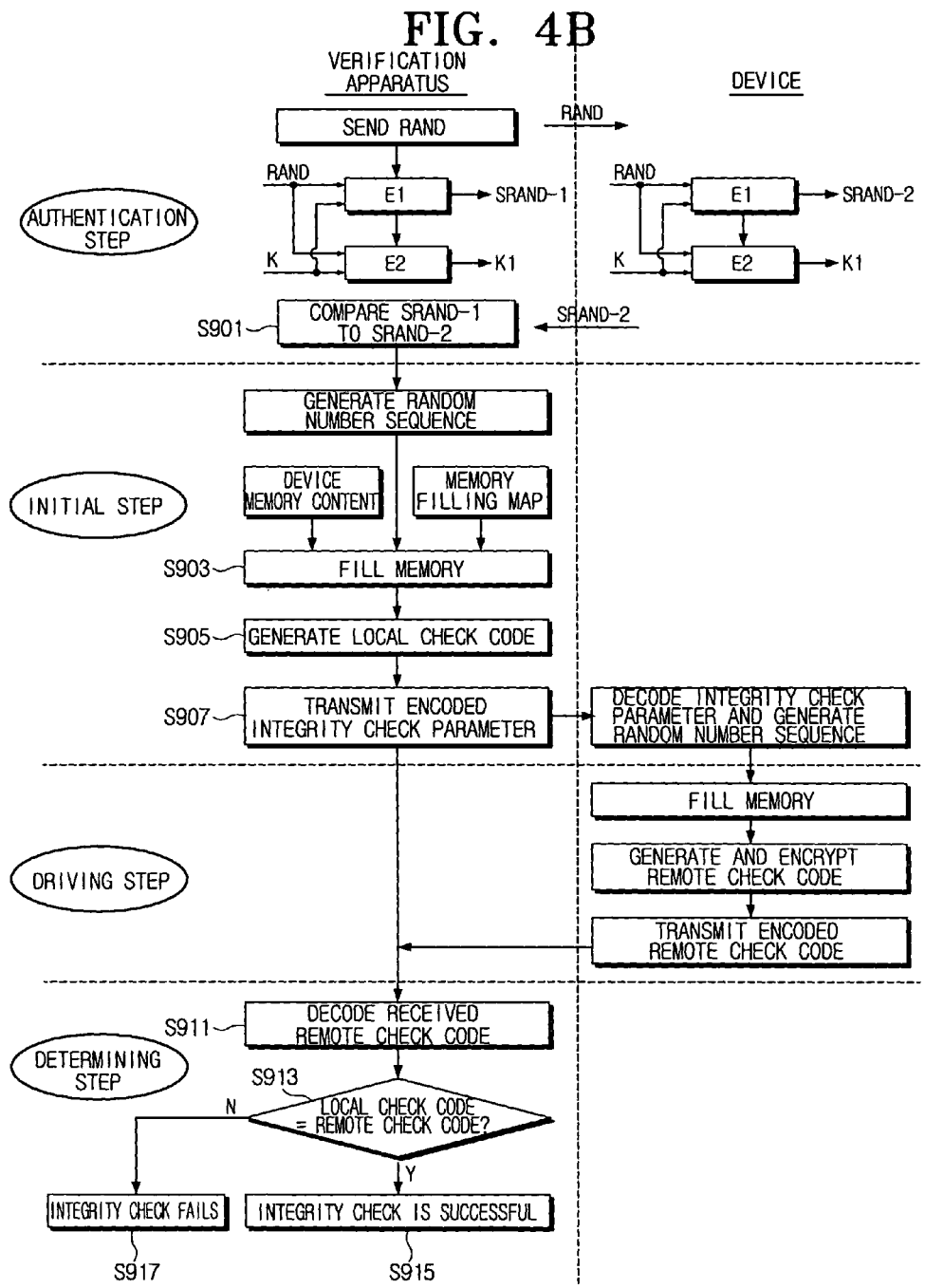

APPARATUS AND SYSTEM FOR REMOTELY VERIFYING INTEGRITY OF MEMORY FOR MOBILE PLATFORM, AND METHOD THEREFOR

CROSS-REFERENCE TO RELATED APPLICATIONS

This application claims priority from Korean Patent Application No. 2005-14881, filed on Feb. 23, 2005, in the Korean Intellectual Property Office, the entire content of which is incorporated herein by reference.

BACKGROUND OF THE INVENTION

1. Field of the Invention

The present invention relates to an apparatus, system, and method for remotely verifying the integrity of a device for a mobile platform. When both the device and the verification apparatus, which is connected to the device via a network, share private information, the apparatus and system can remotely check the integrity of the device by authenticating the device by comparing a check code generated by a verification apparatus with a check code generated by the device and determining whether the two check codes match each other.

2. Description of the Related Art

FIG. 1 illustrates a conventional method for verifying the integrity of a device.

Referring to FIG. 1, television set-top boxes, mobile telephones, local area network (LAN)-based or wide area network (WAN)-based personal computers (PCs) and remote network equipment, such as small-sized sensors, are susceptible to attacks from hackers since network hosts or service providers have limited capabilities in controlling user access to devices. Furthermore, it is difficult for network hosts or service providers to check remote devices physically and determine whether the remote devices have been changed, for example, whether unauthorized users have accessed software applications on a network. Therefore, there is a need for a technique to verify the integrity of a memory in a remote device in a network environment. Here, integrity refers to the certainty that only authorized people are allowed to access or change the information on data and the certainty of network security.

Conventional methods of verifying the integrity of a memory in a device include comparing a digest value for selected software with a hash value for a memory area in a remote device.

The conventional method of verifying the integrity using a hash value for a memory area in a device is disclosed in U.S. Patent Publication No. 2002/0138544. In this method, a random seed is inserted into a memory area to obtain a hash value. And then the random seed, a hash function and the information about the memory area to be tested are sent to the device. The device produces the hash value of the memory area using the information received from a verification apparatus and sends the generated hash value to the verification apparatus. The verification apparatus compares its generated hash value for the memory area with the hash value generated by the device and checks the integrity of the memory area based on a comparison result.

This method uses the hash value for a memory area to verify the integrity. For this reason, if a malicious code such as virus changes its position and attacks different parts of the memory, the integrity check will be successful when it should not be successful. As a result, the verification apparatus cannot correctly verify the integrity of the device.

The conventional method of verifying the integrity of a device using a digest value of selected software is disclosed in U.S. Pat. No. 6,748,538. In this method, the digest value for the software installed in the device is stored with a signature in a memory. The integrity of the software is checked by comparing the signed digest value with the digest value obtained by applying a separate hash function to the selected software. However, this method has a limitation in that it can verify only the integrity of the software stored in the device.

U.S. Pat. No. 6,138,236 discloses a method of verifying the integrity of software with a code stored in a programmable read only memory (PROM) which checks the signature of the software during booting. However, this method can internally check the integrity of software only during booting. A separate secure mechanism is needed to externally check the integrity of software since it is impossible to correctly check the integrity when an attacker changes the contents of a PROM and creates a valid check code.

Accordingly, there is a need for an integrity verification method capable of coping with a malicious code that attacks different parts of a memory and externally verifying the integrity of a device during runtime as well as during booting of the device.

SUMMARY OF THE INVENTION

Accordingly, it is an object of the present invention to provide an apparatus and system that remotely verifies the integrity of a device for a mobile platform and a method capable of remotely authenticating the device and checking the integrity of the device simultaneously.

It is another object of the present invention to provide an apparatus and system for remotely verifying the integrity of a device for a mobile platform and a method capable of correctly checking the integrity of the device by authenticating the device, comparing a check code generated by a verification apparatus with a check code generated by the device and determining whether the two check codes match with each other when both the device and the verification apparatus share private information.

The above object of the present invention is substantially realized by providing an apparatus for verifying the integrity of a device that is connected to a network and has a shared private key. The apparatus includes a verifying unit that determines whether the device has a shared private key by determining whether an authentication code generated by the verification apparatus matches an authentication code generated by the device; a calculating unit that, when the device has the shared private key, fills the empty areas of a memory in the device with random numbers based on a pre-stored memory filling map and generates a local check code that is a message authentication code (MAC) for verifying the integrity of the memory; an interface unit that transmits, to the device, the information on the authentication code generated by the verification apparatus and the integrity check parameter used to produce a remote check code that is a MAC generated by the device, and receives the authentication code and the remote check code from the device; and a determining unit that verifies the integrity of the memory by checking whether the local check code matches the remote check code.

In an exemplary embodiment, the verifying unit may include a generating unit that produces a random number used to generate an authentication code; and an encoding unit that encrypts the random number and the shared private key and determines whether the authentication code generated by the verification apparatus matches the authentication code generated by the device.

In an exemplary embodiment, the apparatus may further include a storing unit that stores the contents of the memory in the device, the random numbers, the memory filling map, the shared private key, and a generating function used to generate a MAC.

In an exemplary embodiment, the apparatus may further include a random number generating unit that, using a random function, generates random numbers to fill the empty areas of the memory.

The calculating unit in the apparatus produces a local check code by reading the contents of the memory in a reverse order and applying a MAC generating function to the contents.

In an exemplary embodiment, the apparatus may further include a decoding unit that decodes the remote check code encoded using the shared private key.

The device may include an interface unit that receives an integrity check parameter and the information on an authentication code generated by the verification apparatus, and transmits the authentication code generated by the device and the generated remote check code to the verification apparatus; an authenticating unit that generates an authentication code using the random number and the information on the authentication code generated by the verification apparatus; a code generating unit that produces a remote check code using the received integrity check parameter and a MAC generating function; and a central processing unit (CPU) that stores the MAC generating function and the shared private key.

In this case, the integrity check parameter may comprise the memory filling map and the information on the random number used to generate the local check code.

In an exemplary embodiment, the apparatus may further comprise a random number generating unit that generates the random number used to produce a remote check code by applying a random function and the information on the random number used to generate a local check code.

The code generating unit generates a remote check code by filling the empty areas of the memory in the device with the random numbers generated based on the memory filling map, reading the contents of the memory in a reverse order and applying the MAC generating function to the contents.

In accordance with another aspect of the present invention, a system comprises a device with a shared private key and a verification apparatus communicably connected to the device over a network to remotely verify the integrity of a memory in the device. Further, the system comprises the verification apparatus that determines whether the device has a shared private key by checking whether an authentication code generated by the device matches an authentication code generated by the verification apparatus, generates a local check code that is a MAC by filling the empty areas of a memory in the device with random numbers and verifies the integrity of the device by determining whether the remote check code generated by the device, which is a MAC for verifying the integrity of the device, matches the local check code; and the device that generates an authentication code using the information on the authentication code produced by the verification apparatus and creates a remote check code based on the information used to generate a local check code.

The verification apparatus may include a verifying unit that determines whether the device has a shared private key by checking whether the authentication code generated by the verification apparatus matches the authentication code generated by the device; a calculating unit that, when the device has a shared private key, fills the empty areas of a memory in the device with random numbers based on a pre-stored memory filling map and generates a local check code that is a MAC for verifying the integrity of the memory; an interface unit that transmits, to the device, the information on the authentication code generated by the verification apparatus and the integrity check parameter that the device uses to generate a remote check code, which is a MAC for verifying the integrity of the memory, and receives the authentication code and the remote check code from the device; and a determining unit that verifies the integrity of the memory by checking if the local check code matches the remote check code.

The device may include an interface unit that receives the integrity check parameter and the information that the verification apparatus uses to generate an authentication code, and transmits the authentication code and the remote check code generated by the device to the verification apparatus; an authenticating unit that generates an authentication code using the random number and the information that the verification apparatus uses to create the authentication code; a code generating unit that generates a remote check code using the received integrity check parameter and a MAC generating function; and a CPU that stores the MAC generating function and the shared private key.

In accordance with yet another aspect of the present invention, there is provided a method for verifying the integrity of a device that is connected to a verification apparatus over a network and has a shared private key. The method includes determining whether the device has the shared private key by checking whether the authentication code generated by the verification apparatus matches the authentication code generated by the device; when the device has the shared private key, filling the empty areas of a memory in the device with random numbers based on a pre-stored memory filling map and generating a local check code that is a MAC for verifying the integrity of the memory; transmitting, to the device, the information that the verification apparatus uses to generate the authentication code and the integrity check parameter that the device uses to create a remote check code, which is a MAC for verifying the integrity of a memory, and receiving the authentication code and the remote check code from the device; and verifying the integrity of the memory by checking if the local check code matches the remote check code.

The determining operation may include generating a random number used to create an authentication code, encoding the random number and the shared private key and determining whether the authentication code generated by the verification apparatus matches the authentication code generated by the device.

In an exemplary embodiment, the method may further include storing the contents of the memory in the device, the random numbers, the memory filling map, the shared private key and the generating function that is used to create a MAC.

In an exemplary embodiment, the method may further include generating random numbers to fill the empty areas of the memory using a random function.

The operation of generating a local check code may comprise reading the contents of the memory in a reverse order and generating a local check code by applying a MAC generating function to the contents.

In an exemplary embodiment, the method may further include decoding a remote check code if it is encoded using a shared private key.

The operation of generating a local check code may include generating an authentication code using the random number and the information that the verification apparatus uses to generate an authentication code; generating a remote check code using the received integrity check parameter and a MAC generating function; and transmitting the authentication code generated by the device and the generated remote check code to the verification apparatus.

An integrity check parameter may include the memory filling map and the information on the random number used to generate a local check code.

In an exemplary embodiment, the method may further include generating the random number used to produce a remote check code by applying the random function and the information on the random number used to generate a local check code.

The operation of generating a remote check code may include filling the empty areas of the memory in the device with the generated random numbers based on the memory filling map, reading the contents of the memory in a reverse order, applying the MAC generating function to the contents and creating a remote check code.

In accordance with yet another aspect of the present invention, there is provided a method based on the system that includes a device and a verification apparatus communicably connected to the device over a network for remotely verifying the integrity of a memory in the device. The method comprises determining whether the device has a private key shared with the verification apparatus by checking whether the authentication code generated by the device matches the authentication code generated by the verification apparatus; filling the empty areas of a memory in the device with the random numbers based on a pre-stored memory filling map and generating a local check code that is a MAC for verifying the integrity of the memory; transmitting, to the device, the integrity check parameter used to generate a remote check code that is a MAC generated by the device to verify the integrity of a memory; generating a remote check code using the received integrity check parameter and transmitting the remote check code generated by the device to the verification apparatus; and verifying the integrity of the memory in the device by checking whether the local check code matches the remote check code.

BRIEF DESCRIPTION OF THE DRAWINGS

The above aspects and features of the present invention will be more apparent by describing certain exemplary embodiments of the present invention with reference to the accompanying drawings, in which:

FIGS. 4A and 4B illustrate a method by which the integrity of a memory for a mobile platform is remotely verified according to an exemplary embodiment of the present invention.

DETAILED DESCRIPTION OF THE EXEMPLARY EMBODIMENT

Hereinafter, the present invention will be described in detail with reference to the accompanying drawings.

Figure 1:
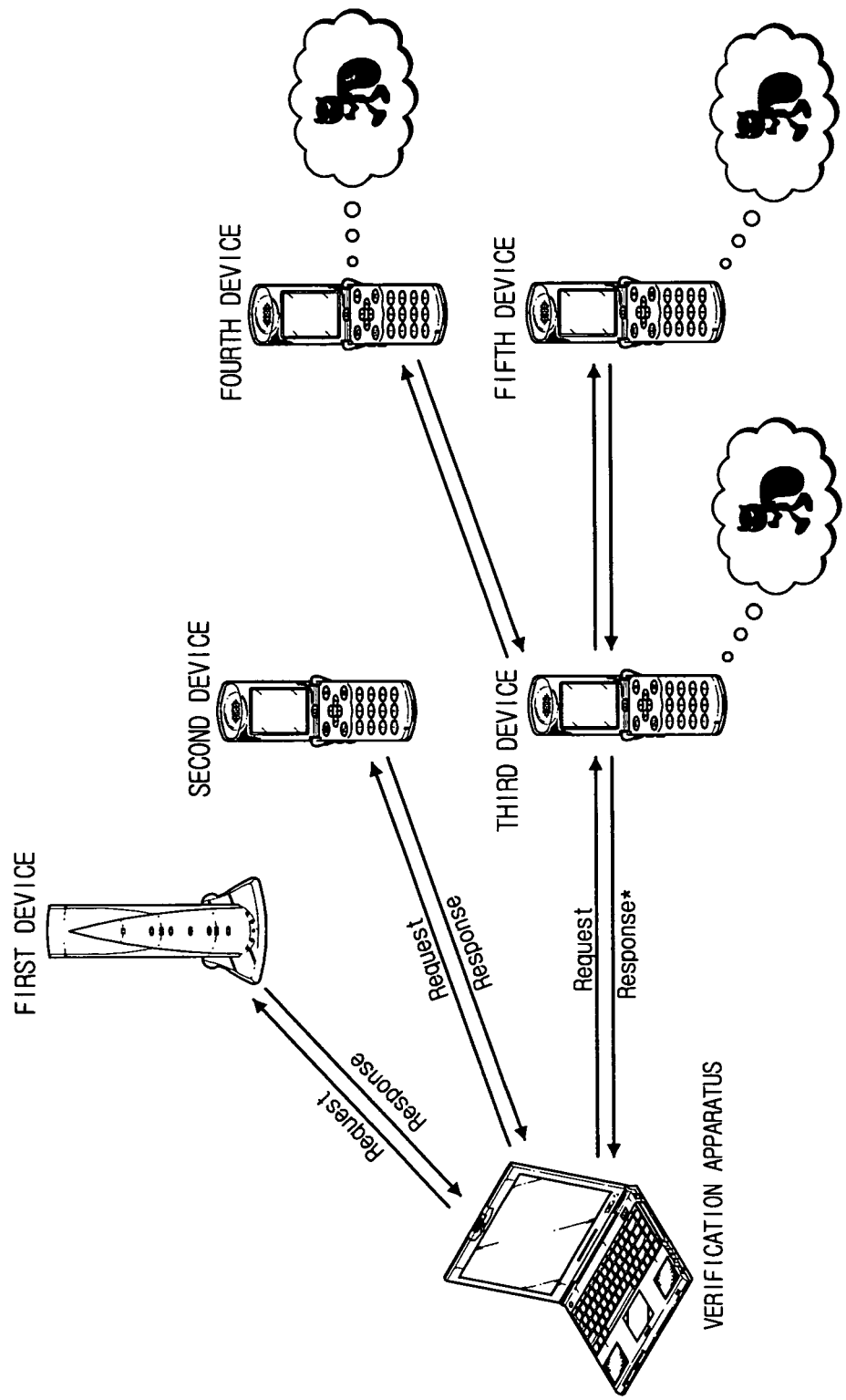
FIG. 1 illustrates a conventional method by which the integrity of a device is verified.
Figure 2:
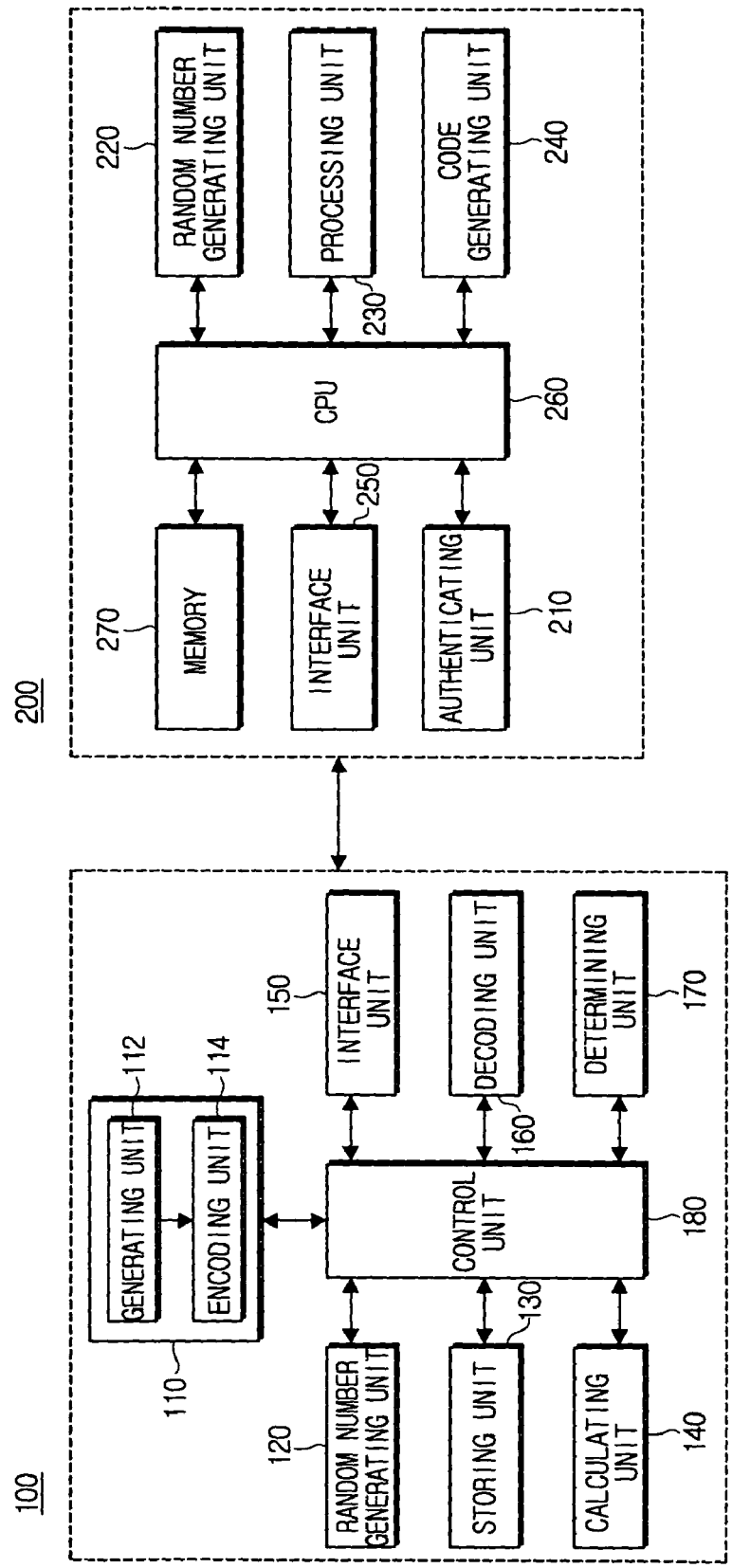
FIG. 2 illustrates a system that remotely verifies the integrity of a memory for a mobile platform according to an exemplary embodiment of the present invention.

FIG. 2 illustrates a system that remotely verifies the integrity of a memory for a mobile platform according to an exemplary embodiment of the present invention.

Referring to FIG. 2, the system comprises a device 200 and a verification apparatus 100 that can communicate with the device 200 over a network.

The verification apparatus 100 comprises a verifying unit 110, a random number generating unit 120, a storing unit 130, a calculating unit 140, an interface unit 150, a decoding unit 160, a determining unit 170 and a control unit 180.

The verifying unit 110 comprises a generating unit 112 and an encoding unit 114. The verifying unit 110 determines whether a device to be tested shares private information with the verification apparatus 100 by comparing the authentication code generated by the verifying unit 100 with the authentication code generated by the device 200. The generating unit 112 creates a random number used to generate an authentication code using the private key that is the shared private information. Here, the generating unit 112 may use a random function to generate the random number.

The encoding unit 114 is equipped with the first and second encryption algorithms. The encoding unit 114 creates the encoded random number produced by the generating unit 112 using the random number, the shared key and the first encryption algorithm. The encoding unit 114 further creates an encoded shared key using the generated random number, the shared key and the second encryption algorithm.

Using a pre-stored random function, the random number generating unit 120 generates random numbers that will fill the empty areas of the memory 270 in the device 200.

The storing unit 130 stores the random function used by the random number generating unit 120, the contents of the memory 270 in the device 200 of which the integrity is to be tested, the memory filling map used to fill the empty areas of the memory 270 in the device 200 with the random numbers, the MAC generating function used to generate a local check code that is a MAC for verifying the integrity of the device 200, and the shared key that is the private information shared with the device 200, the first, second and third encryption algorithms for encoding data, and a decoding algorithm for decoding an encoded remote check code.

The storing unit 130 stores the contents of the memories in the devices of which the integrity will be verified by the verification apparatus 100. The memory filling map may refer to the method by which the empty areas of a memory 270 are filled with random numbers, and the method can be either sequential or random.

The calculating unit 140 fills the empty areas of the memory 270 with random numbers based on the memory filling map, reads the contents of the filled memory in a reverse order and generates a local check code to verify the integrity of the device 200 using the MAC generating function stored in the storing unit 130. The MAC generating function produces a code attached to data, which is used to check data alteration, such as modification, deletion and insertion of data. One example of a MAC generating function may be a hash function.

The interface unit 150 transmits, to the device 200, the random number generated by the generating unit 112, i.e., a random number used to generate an authentication code by the encoding unit 114 of the verifying unit 110 and receives an encoded random number that is an authentication code from the device 200.

The interface unit 150 transmits data to and receives data from the device 200. The interface unit 150 receives an encoded remote check code from the device 200, and transmits the encoded integrity check parameter used to generate a remote check code. An encoded integrity check parameter refers to a value obtained by applying the third encryption algorithm to the memory filling map stored in the storing unit 130 and the encoded shared key.

The decoding unit 160 decodes the encoded remote check code received from the device 200 using the decoding algorithm stored in the storing unit 130 and the shared key encoded by the encoding unit 114.

The determining unit 170 determines whether the remote check code decoded by the decoding unit 160 matches the local check code generated by the calculating unit 140. If the remote check code matches the local check code, the determining unit 170 concludes that the integrity check for the device 200 is successful. If the remote check code does not match the local check code, the determining unit 170 determines that the integrity check for the device 200 has failed.

The control unit 180 controls all of the components of the verification apparatus 100. The control unit 180 first selects a memory 270 in the device 200 of which the integrity will be checked. If the selected device 200 has the private key shared with the verification apparatus 100, the control unit 180 controls the interface unit 150 so that the interface unit 150 transmits the encoded integrity check parameter to the device 200 that contains the selected memory contents.

The device 200 includes an authenticating unit 210, a random number generating unit 220, a processing unit 230, a code generating unit 240, an interface unit 250, a CPU 260 and the memory 270.

The interface unit 250 of the device 200 transmits data to and receives data from the verification apparatus 100. The interface unit 250 transmits the encoded remote check code generated by the code generating unit 240 to the interface unit 150 of the verification apparatus 100 and receives the encoded integrity check parameter used to generate a remote check code from the interface unit 150.

The authenticating unit 210 receives the random number used to generate the authentication code from the verifying unit 110 of the verification apparatus 100 and generates the encoded private key by applying the second encryption algorithm to the private key and the random number. The authenticating unit 210 applies the first encryption algorithm to the received random number and the shared private key to generate an encoded random number, and then transmits the generated encoded random number to the verification apparatus 100.

The random number generating unit 220 generates random numbers that will fill the empty areas of the memory 270 in the device 200 using the pre-stored random function.

The processing unit 230 decodes the encoded integrity check parameter received via the interface unit 250 of the device 200 using the same algorithm as the decoding algorithm used by the determining unit 170 of the verification apparatus 100.

The code generating unit 240 generates a remote check code using the memory filling map received from the verification apparatus 100 and the random numbers generated by the random number generating unit 220. The code generating unit 240 creates an encoded remote check code by applying the third encryption algorithm that the verification apparatus 100 uses to encode the integrity check parameter to the generated remote check code and the private key shared with the verification apparatus 100.

Specifically, the code generating unit 240 fills the empty areas of the memory 270 with the random numbers generated by the random number generating unit 220 based on the received memory filling map, as in the calculating unit 140 of the verification apparatus 100. The code generating unit 240 generates an encoded remote check code by applying the encryption algorithm to the contents of the memory 270 completely filled with the random numbers.

The CPU 260 controls all the components of the device 200. The CPU 260 stores a MAC generating function used when the code generating unit 240 generates a remote check code and a shared private key. The CPU 260 stores the first and second encryption algorithms that are used when the authenticating unit 210 generates an encoded random number and an encoded shared key. These algorithms are identical to the encryption algorithms used by the verifying unit 110 of the verification apparatus 100. The CPU 260 also stores a decoding algorithm that is identical to the decoding algorithm used when the decoding unit 160 decodes a remote check code.

Figure 3A:
FIGS. 3A to 3D illustrate the process of generating a local check code in a system that remotely verifies the integrity of a memory for a mobile platform according to an exemplary embodiment of the present invention.
Figure 3B:
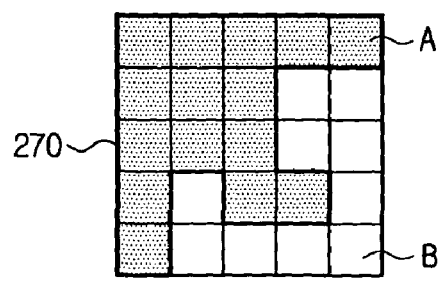
Figure 3C:
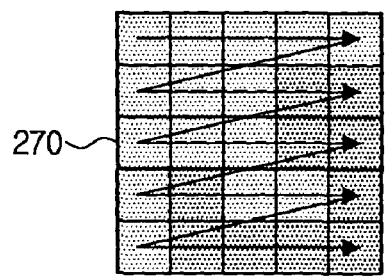
Figure 3D:
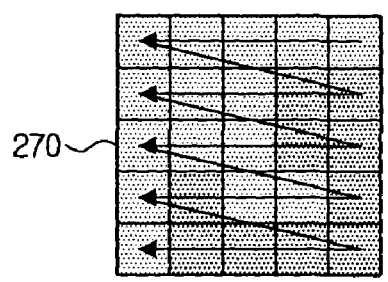

FIGS. 3A to 3D illustrate the process of generating a local check code in a system for remotely verifying the integrity of a memory in a device according to an exemplary embodiment of the present invention. FIG. 3A illustrates a random number sequence generated by the random number generating unit 120. FIG. 3B illustrates the contents of the memory 270 in the device 200 of which the integrity will be tested. FIG. 3C illustrates the empty areas of the memory 270 in the device 200 filled with the random numbers, and FIG. 3D illustrates the operation of which the calculating unit 140 generates a local check code.

Referring to FIG. 3A, the random number generating unit 120 produces a random number sequence using a random function.

Referring to FIG. 3B, "A" areas indicate the areas of the memory 270 where contents such as software are stored, and "B" areas represent the empty areas of the memory 270.

Referring to FIG. 3C, the random numbers as shown in FIG. 3A fills the empty areas of the memory 270 in a predetermined manner using the memory filling map that is one of the integrity check parameters received from the verification apparatus 100. FIG. 3C illustrates the operation where the empty spaces of the memory 270 are sequentially filled with the random numbers using the memory filling map.

Referring to FIG. 3D, the data in the memory of which the empty spaces are completely filled with the random numbers is read in a reverse order, and a local check code is generated using a MAC generating function such as a hash function. This method increases security.

Figure 4A:
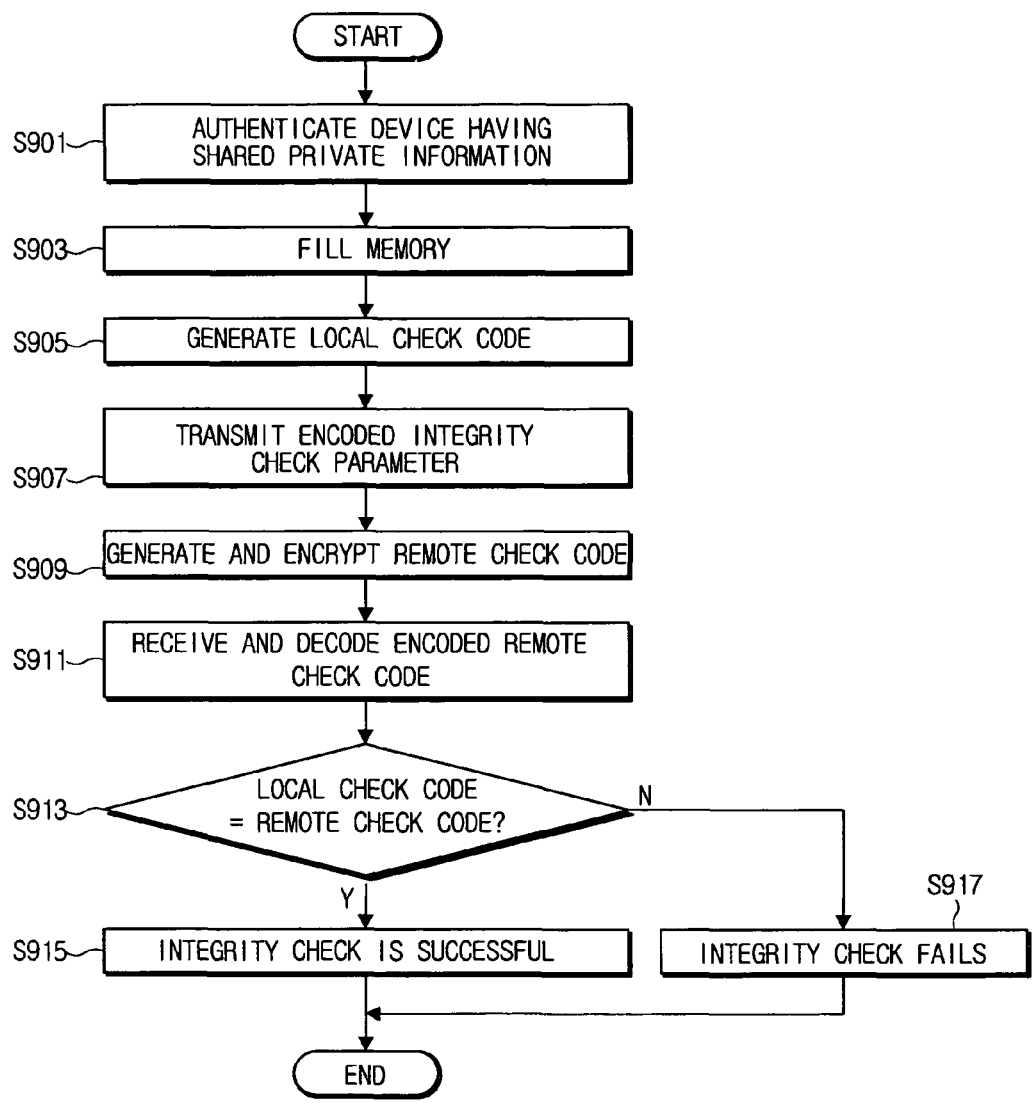

FIGS. 4A and 4B illustrate a method for remotely verifying the integrity of a memory for a mobile platform according to an exemplary embodiment of the present invention.

Referring to FIGS. 4A and 4B, in operation S901, it is determined whether the authentication code generated by the device 200 matches the authentication code generated by the verification apparatus 100 in order to determine whether the device 200 shares the private key with the verification apparatus 100. Specifically, the verification apparatus 100 generates an authentication code that is the encoded random number SRAND-1 by applying the first encryption algorithm E1 to the random number RAND and the shared private key K. The verification apparatus 100 also generates an encoded shared private key K1 by applying the second encryption algorithm E2 to the random number RAND and the shared private key K. Here, the encoded shared private key K1 is used to encrypt the integrity check parameter used to generate a remote check code, and also to decode the encoded remote check code.

The verification apparatus 100 transmits the random number used to generate the authentication code to the device 200. The device 200 creates the authentication code SRAND-2 by applying the first encryption algorithm E1 to the received random number RAND and the shared private key K. The device 200 generates the encoded shared private key K1 by applying the second encryption algorithm E2 to the random number RAND and the shared private key K. The device 200 transmits the generated authentication code SRAND-2 to the verification apparatus 100.

The verification apparatus 100 compares the generated authentication code SRAND-1 with the authentication code SRAND-2 received from the device 200. If SRAND-1 and SRAND-2 match each other, the verification apparatus 100 concludes that the device 200 has the shared private key K.

The verification apparatus 100 then fills the empty areas of the memory 270 in the device 200 with the random numbers generated by the random number generating unit 120 based on the pre-stored memory filling map (S903).

The verification apparatus 100 then generates a local check code that is a MAC for verifying the integrity of the memory 270 (S905). In this case, the verification apparatus 100 reads the contents of the completely filled memory 270 in a reverse order and produces a local check code by applying a MAC generating function, such as a hash function.

The verification apparatus 100 then transmits, to the device 200, the integrity check parameter used to generate a remote check code, which is the MAC generated by the device 200 for verifying the integrity of the memory 270 (S907). The integrity check parameter is encrypted using the encoded shared private key and transmitted from the verification apparatus 100 to the device 200. Here, the integrity check parameter includes the memory filling map, the information on the random number used to generate the local check code, etc.

The device 200 generates a remote check code using the received integrity check parameter and transmits the generated remote check code to the verification apparatus 100 (S909). The device 200 decodes the received encoded integrity check parameter using the shared private key. The device 200 fills the empty areas of the memory 270 in the device with the random numbers based on the memory filling map of the decoded integrity check parameter and generates a remote check code by applying the MAC generating function to the memory contents in a reverse order. The generated remote check code is encoded using the shared private key. Here, the random numbers used to fill the empty areas of the memory 270 are the numbers that the device 200 generates based on the information on the random numbers used to produce the local check code.

The device 200 then decodes the received encoded remote check code using the encoded shared private key (S911).

The device 200 then checks whether the local check code matches the decoded remote check code (S913). If the local check code matches the decoded remote check code, the device 200 determines that the integrity check of the memory 270 is successful (S915). If the local check code does not match the decoded remote check code, the device 200 concludes that the integrity check of the memory 270 has failed (S917).

As described above, it is possible to remotely authenticate the device and check the integrity of the device simultaneously according to an exemplary embodiment of the present invention.

It is also possible to accurately check the integrity of a device when the device and the verification apparatus have a shared private key by authenticating the device and then comparing the check code generated by the verification apparatus with the check code generated by the device.

It is also possible to correctly verify the integrity, even when a malicious code, such as virus, changes its position and attacks different parts of the memory, by filling the empty areas of the memory in the device with random numbers and generating a MAC. In addition, it is possible to remotely verify the integrity of the device even during runtime as well as during booting of the device The foregoing embodiment and advantages are merely exemplary and are not to be construed as limiting the present invention. The present teaching can be readily applied to other types of apparatuses. Also, the description of the embodiments of the present invention is intended to be illustrative and not to limit the scope of the claims. Many alternatives, modifications and variations will be apparent to those skilled in the art.

What is claimed is:

1. A verification apparatus, comprising:
a verifying unit that determines whether a device has a shared private key with the verification apparatus by checking whether a first authentication code generated by the verifying unit matches a second authentication code generated by the device;
a calculating unit that, when the device has the shared private key with the verification apparatus, fills empty areas of a memory of the device with first random numbers based on a pre-stored memory filling map and generates a local check code that verifies an integrity of the memory by reading contents of the memory filled with the first random numbers;
an interface unit that transmits, to the device, information on the first authentication code generated by the verifying unit and an integrity check parameter used to generate a remote check code generated by the device that verifies the integrity of the memory, and receives the second authentication code and the remote check code from the device; and
a determining unit that verifies the integrity of the memory by checking if the local check code matches the remote check code,
wherein the verifying unit generates the first authentication code using a second random number,
wherein the verifying unit comprises:
a generating unit that produces the second random number used to generate the first authentication code; and
an encoding unit that encrypts the second random number and the shared private key and determines whether the first authentication code generated by the verification apparatus matches the second authentication code generated by the device;
wherein the verification apparatus is communicably connected to the device over a network, to remotely verify the integrity of the memory in the device.

2. The apparatus as claimed in claim 1, the verification apparatus further comprising a storing unit that stores contents of the memory in the device, the first random numbers to fill the empty areas of the memory, the memory filling map, the shared private key and a generating function used to generate at least one of the local check code and the remote check code.

3. The apparatus as claimed in claim 1, the verification apparatus further comprising a random number generating unit that, using a random function, generates the first random numbers to fill the empty areas of the memory.

4. The apparatus as claimed in claim 1, wherein the calculating unit produces the local check code by reading contents of the memory in a reverse order and applying a message authentication code (MAC) generating function to the contents.

5. The apparatus as claimed in claim 1, the verification apparatus further comprising a decoding unit that decodes the remote check code encoded by the device by using the shared private key.

6. The apparatus as claimed in claim 1, wherein the device comprises:
   an interface unit that receives the integrity check parameter and the information on the first authentication code generated by the verification apparatus, and transmits the second authentication code generated by the device and the generated remote check code to the verification apparatus;
   an authenticating unit that generates the second authentication code using the second random number and the information on the first authentication code generated by the verification apparatus;
   a code generating unit that produces the remote check code using the received integrity check parameter and a message authentication code (MAC) generating function; and
   a central processing unit (CPU) that stores the MAC generating function and the shared private key.

7. The apparatus as claimed in claim 6, wherein the integrity check parameter comprises the memory filling map, and information on the second random number used to generate the local check code.

8. The apparatus as claimed in claim 7, the device further comprising a random number generating unit that generates the second random number used to produce the remote check code by applying the random function and the information on the second random number used to generate the local check code.

9. The apparatus as claimed in claim 8, wherein the code generating unit generates the remote check code by filling the empty areas of the memory in the device with the generated first random numbers based on the memory filling map, reading contents of the memory in a reverse order and applying the MAC generating function to the contents.

10. The apparatus as claimed in claim 1, wherein at least one of said local check code and said remote check code is a message authentication code (MAC).

11. A system comprising:
   the verification apparatus that determines whether the device has the shared private key with the verification apparatus by checking whether a second authentication code generated by the device matches a first authentication code generated by the verification apparatus, generates a local check code by filling empty areas of the memory in the device with first random numbers, and verifies the integrity of the device by determining whether the local check code matches the remote check code; and
   the device that generates the second authentication code using the information on the first authentication code produced by the verification apparatus and creates the remote check code based on the information used to generate the local check code,
   wherein the verification apparatus generates the first authentication code using a second random number,
   wherein the verification apparatus comprises a verifying unit which comprises:
      a generating unit that produces the second random number used to generate the first authentication code; and
      an encoding unit that encrypts the second random number and the shared private key and determines whether the first authentication code generated by the verification apparatus matches the second authentication code generated by the device;
   wherein the verification apparatus is communicably connected to the device over a network, to remotely verify the integrity of the memory in the device.

12. The system as claimed in claim 11, wherein the verification apparatus comprises:
   a verifying unit that determines whether the device has the shared private key with the verification apparatus by checking whether the first authentication code generated by the verification apparatus matches the second authentication code generated by the device;
   a calculating unit that, when the device has the shared private key with the verification apparatus, fills the empty areas of the memory in the device with first random numbers based on a pre-stored memory filling map and generates the local check code that verifies the integrity of the memory;
   an interface unit that transmits, to the device, the information on the first authentication code generated by the verification apparatus and an integrity check parameter that the device uses to generate a remote check code, generated by the device that verifies the integrity of the memory, and receives the second authentication code and the remote check code from the device; and
   a determining unit that verifies the integrity of the memory by checking if the local check code matches the remote check code.

13. The system as claimed in claim 11, wherein the device comprises:
   an interface unit that receives the integrity check parameter and the information that the verification apparatus used to generate the first authentication code, and transmits the second authentication code and the remote check code generated by the device to the verification apparatus;
   an authenticating unit that generates the second authentication code using the second random number and the information that the verification apparatus uses to create the first authentication code;
   a code generating unit that generates the remote check code using the received integrity check parameter and a message authentication code (MAC) generating function; and
   a CPU that stores a message authentication code (MAC) generating function and the shared private key.

14. The system as claimed in claim 11, wherein at least one of said local check code and said remote check code is a message authentication code (MAC).

15. A method comprising:
   determining whether a device has a shared private key with a verification apparatus by checking whether a first authentication code generated by the verification apparatus matches a second authentication code generated by the device;
   when the device has the shared private key with the verification apparatus, filling empty areas of a memory in the device with first random numbers based on a pre-stored memory filling map and generating a local check code that verifies an integrity of the memory by reading contents of the memory filled with the first random number;
   transmitting, to the device, information on the first authentication code generated by the verification apparatus and an integrity check parameter used to create a remote check code, that verifies the integrity of the memory, and receiving the second authentication code and the remote check code from the device; and verifying the integrity of the memory by checking if the local check code matches the remote check code, wherein the verification apparatus generates the first authentication code using a second random number, wherein the determining operation comprises:

generating the second random number used to create the first authentication code; and encoding the second random number and the shared private key and determining whether the first authentication code generated by the verification apparatus matches the second authentication code generated by the device;

wherein the verification apparatus is communicably connected to the device over a network, to remotely verify the integrity of the memory in the device.

16. The method as claimed in claim 15, further comprising storing contents of the memory in the device, the first random numbers to fill the empty areas of the memory, the memory filling map, the shared private key and a generating function that is used to create at least one of the local check code and the remote check code.

17. The method as claimed in claim 15, further comprising generating the first random numbers to fill the empty areas of the memory using a random function.

18. The method as claimed in claim 15, wherein the generating the local check code comprises:

reading contents of the memory in a reverse order, and generating the local check code by applying a message authentication code (MAC) generating function to the contents.

19. The method as claimed in claim 15, further comprising decoding the remote check code if the remote check code is encoded using the shared private key.

20. The method as claimed in claim 15, wherein the operation of generating the local check code comprises:

generating the second authentication code using the first random number and the information that the verification apparatus uses to generate the first authentication code;

generating the remote check code using the received integrity check parameter and a message authentication code (MAC) generating function; and transmitting the second authentication code generated by the device and the generated remote check code to the verification apparatus.

21. The method as claimed in claim 20, wherein the integrity check parameter comprises the memory filling map and information on the first random number used to generate the local check code.

22. The method as claimed in claim 20, further comprising generating the first random number used to produce the remote check code by applying a random function and information on the first random number used to generate the local check code.

23. The method as claimed in claim 22, wherein the operation of generating the remote check code comprises filling the empty areas of the memory in the device with the generated first random numbers based on the memory filling map, reading contents of the memory in a reverse order, applying the MAC generating function to the contents and creating the remote check code.

24. The method as claimed in claim 15, wherein at least one of said local check code and said remote check code is a message authentication code (MAC).

25. A method comprising:

determining whether a device has a private key shared with a verification apparatus by checking whether a first authentication code generated by the device matches a second authentication code generated by the verification apparatus;

the verification apparatus filling empty areas of the memory in the device with first random numbers based on a pre-stored memory filling map and generating a local check code that verifies an integrity of the memory by reading contents of the memory filled with the first random number;

the verification apparatus transmitting to the device an integrity check parameter used to generate a remote check code, generated by the device that verifies the integrity of the memory;

the device generating the remote check code using the received integrity check parameter and transmitting the remote check code generated by the device to the verification apparatus; and verifying the integrity of the memory in the device by checking if the local check code matches the remote check code, wherein the verification apparatus generates the second authentication code using a second random number, wherein the verification apparatus comprises a verifying unit which comprises:

a generating unit that produces the second random number used to generate the first authentication code; and an encoding unit that encrypts the second random number and the shared private key and determines whether the first authentication code generated by the verification apparatus matches the second authentication code generated by the device;

wherein the verification apparatus is communicably connected to the device over a network, to remotely verify the integrity of the memory in the device.

26. The method according to claim 25, wherein at least one of said local check code and said remote check code is a message authentication code (MAC).

27. A device which shares a private key with a verification apparatus, the device comprising:

an interface unit that receives an integrity check parameter and information on a first authentication code generated by the verification apparatus, and transmits a second authentication code generated by the device and a generated remote check code to the verification apparatus;

an authenticating unit that generates the second authentication code using a first random number and the information on the first authentication code generated by the verification apparatus;

a code generating unit that produces the remote check code using a received integrity check parameter and a message authentication code (MAC) generating function; and a central processing unit (CPU) that stores the MAC generating function and the shared private key, wherein the verification apparatus generates the first authentication code using a second random number, wherein the verification apparatus comprises a verifying unit which comprises:

a generating unit that produces the second random number used to generate the first authentication code; and an encoding unit that encrypts the second random number and the shared private key and determines whether the first authentication code generated by the verification apparatus matches the second authentication code generated by the device;

wherein the integrity check parameter comprises a memory filling map to fill empty areas of a memory in the device, and information on the first random number used to generate a local check code;

wherein the verification apparatus is communicably connected to the device over a network, to remotely verify the integrity of the memory in the device.

28. The device as claimed in claim 27, further comprising a random number generating unit that generates the first random number used to produce the remote check code by applying a random function and the information on the first random number used to generate the local check code.

29. The device as claimed in claim 28, wherein the code generating unit generates the remote check code by filling the empty areas of the memory in the device with the generated first random numbers based on the memory filling map, reading contents of the memory in a reverse order and applying the MAC generating function to the contents.

* * * * *